United States Patent [19]
Kita

[11] 3,838,628
[45] Oct. 1, 1974

[54] VACUUM SERVO-MOTOR
[75] Inventor: Yasuo Kita, Takarazuka, Japan
[73] Assignee: Sumitomo Electric Industries, Ltd., Higashi-ku, Osaka, Japan
[22] Filed: Jan. 17, 1973
[21] Appl. No.: 324,264

[30] Foreign Application Priority Data
Jan. 29, 1972  Japan..........................47-108/0

[52] U.S. Cl. ............................... 91/369 B, 91/376
[51] Int. Cl. ............................................ F15b 9/10
[58] Field of Search .......... 91/369 B, 369 A, 369 R, 91/376

[56] References Cited
UNITED STATES PATENTS
| | | | |
|---|---|---|---|
| 2,949,892 | 8/1960 | Ayers, Jr. | 91/369 B |
| 2,980,068 | 4/1961 | Stelzer | 91/369 B |
| 2,989,033 | 6/1961 | Stelzer | 91/369 B |
| 3,316,816 | 5/1967 | Yardley | 91/369 B |

Primary Examiner—Paul E. Maslousky
Attorney, Agent, or Firm—Pollock, Philpitt & Vande Sande

[57] ABSTRACT

In a vacuum servo-motor for boosting an input force in which a boosting force due to a pressure difference in the housing always acts upon predetermined acting points of a deflection means and a demand of different boosting capacity is satisfied with only a change of a few parts by an improved combination of a piston and a deflection means.

4 Claims, 2 Drawing Figures

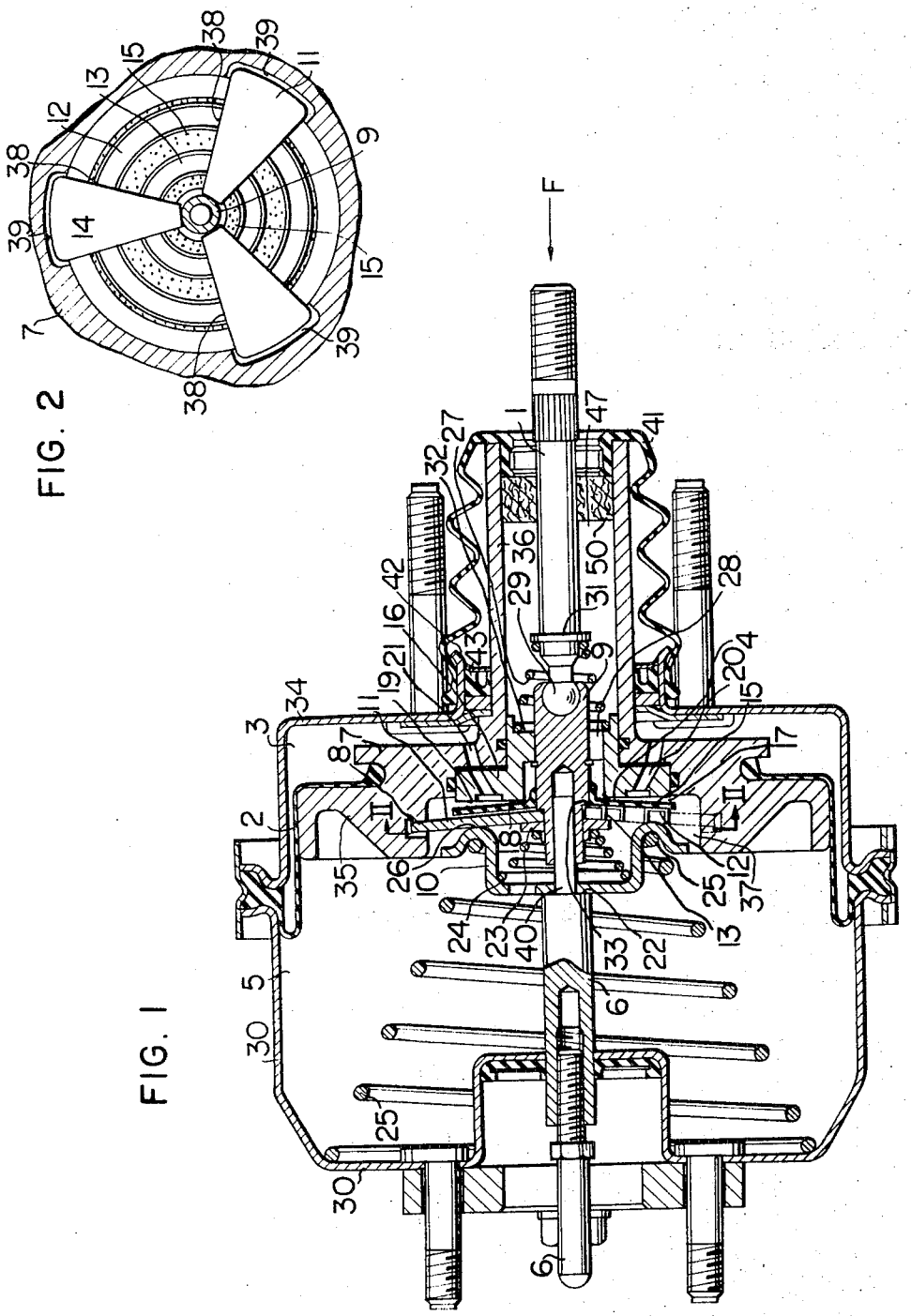

VACUUM SERVO-MOTOR

BACKGROUND OF THE INVENTION

This invention relates to a vacuum servo-motor and more particularly to an improvement of the vacuum servo-motor in which the hysteresis phenomenon in the input-output characteristics, even if the input force either increases or decreases, is considerably improved and a demand of a different boosting capacity is easily satisfied with a change of a few parts in the motor.

The conventional vacuum servo-motor has been designed to transmit directly a pressure difference exerted on a diaphragm in a housing to a defleaction means. Therefore, when an increase of the boosting capacity is required, finger plates lengthed longitudinally which form the deflection means and a fulcrum plate associated with the deflection means must be enlarged with the outward displacement of the acting point of the pressure difference applied to the finger plates. The present invention is so constructed that the pressure difference between both chambers in the housing acts upon a piston connected air-tightly with the diaphragm, and only the diameters of the diaphragm, the piston and the housing need to be changed when a different boosting capacity is required, and a power transmitting mechanism such as the deflection means and the fulcrum plate can be used commonly, thus allowing the use of common parts and meeting readily the demand of the different boosting capacities. It will be understood that various sizes of the fulcrum plate and the piston may be used for changing the boosting ratio and the boosting capacity as required.

The finger plates of the deflection means are supported on predetermined pivot points and acting points at any time when the motor is in use; therefore, the motor is improved to eliminate the hysteresis phenomenon in the input-output characteristics even if the input force either increases or decreases. Further, as the motor of the present invention exhibits further advantages by employing three finger plates, the motor of the present invention is simple in structure as compared with that of the prior motor of this kind.

The present invention has an object to provide an improved motor wherein a piston is used and a demand for a different boosting capacity is satisfied with only the change of a few parts.

Another object of the present invention is to provide an improved motor wherein the boosting force due to the pressure difference in the housing acts upon the predetermined acting point through the piston and the diaphragm regardless of a variation of working area of the partition member having the diaphragm and the piston, thus eliminating the hysteresis phenomenon in the input-output characteristics.

According to the present invention, the above objects are achieved by a vacuum servo-motor comprising a housing having a first chamber and a second chamber therein defined by a partition member, a deflection means having finger plates adapted to be deflected when a force imparted to the partition member by a differential pressure between the pressures within said both chambers is transmitted to the outer ends of said deflection means, a socket adapted to displace the inner ends of said finger plates when an input force is applied to an input shaft, an air valve operable according to a degree of deflection of said deflection means to maintain or cut off a communication between said first chamber and an atmosphere, a vacuum valve operable according to a degree of deflection of said deflection means to maintain or cut off a communication between said first chamber and said second chamber, a fulcrum plate for transmitting a boosting force created on said deflection means by said differential pressure and the input force to an output shaft, characterised in that said partition member comprises a piston disposed in air-tight contact with said housing and slidable in the axial direction of said input force, and a diaphragm air tightly fixed at its one end to said housing and at the other end to said piston, each outer end part of said finger plates engaging each pivot point formed in said piston and each inner end part of said finger plates being swingably supported on said socket.

Preferably, the deflection means comprises three finger plates, two annular supports, and a sealing plate affixed to one side wall of the deflection means and secured at its inner end portion to the socket, the finger plates being received in notches provided on the annular supports at a same spaced distance.

Preferably, a valve seat member is received in a recess of the piston with slidable seal contact and passages are provided in the piston and the valve seat member in facing relation with the sealing plate.

BRIEF DESCRIPTION OF DRAWINGS

The above and other objects and features of the present invention will become clear from the following descriptions with reference to the accompanying drawings, in which;

FIG. 1 is a longitudinal sectional view showing a nonoperative condition of the vacuum servo-motor of the present invention;

FIG. 2 is a sectional view taken along the line II—II in FIG. 1.

DETAILED DESCRIPTION OF INVENTION

Referring now to FIG. 1, an input shaft 1 is connected with a socket 9 through a ball joint 29 and the socket 9 is engaged slidably with an output shaft 6. A housing comprises casings 30, 34 which are of thin metal plate and formed into a substantially cylindrical shape. The casing 30 in secured to the other casing 34 in seal contact therewith by interposing between both casings an outer end of a diaphragm 2. A partition member includes the diaphragm 2 and a piston 7 disposed within the housing. The outer end of the diaphragm is fixed between the facing surfaces of the both casings 30, 34 and an inner end thereof is affixed to the piston 7. The inner space in the housing is divided into two chambers by the partition member to define a first chamber 3 and a second chamber 5 connected to a vacuum source (not shown). The piston 7 has a substantially cylindrical body 35 and an elongated hollow member 36 integral therewith. One side of the cylindrical body 35 is provided with a recess or cavity 37 and a stepped portion formed on the inner wall of the recess 37. Housed in the recess 37 is a valve seat member 16 whose internal wall of a flange 32 slidably engages the socket and the external wall thereof slidably engages the inner wall of the hollow member 36. A sealing plate 15 of a synthetic rubber faces one side wall of the valve seat member 16 and is adhered at its inner peripheral edge to the socket 9.

A deflection means 14 comprises three finger plates 11 and two annular supports 12, 13 radially spaced away one another. Each of the finger plates is received in notches 38 provided on the supports 12, 13 at an equal angle, respectively and is of a substantially triangular configuration whose corners are rounded. The inner end portions of the finger plates 11 pivotally abut a shoulder 33 of the socket 9 to allow an inclination of each finger and the outer end portions thereof are housed in channels 39 formed on the side wall of the recess 37 and shaped to provide pivots 8 for transmitting a boosting force by a pressure difference in the housing to the finger plates 11 when they are displaced as will be described hereinafter.

A bowl-shaped fulcrum plate 10 is made up of a bottom portion, a flange portion raised at right angles and a curled portion at the outer periphery thereof. A reduced end portion 40 of the outer shaft 6 is inserted in a hole bored on the central portion of the fulcrum plate 10 to abut on the adjacent portion of the hole against a shoulder 22 of the output shaft 6. Further, as shown in FIG. 1, an annular edge 26 of the curled portion engages each side surface of the finger plates 11. A return spring 25 is disposed between the inside portion of the curled portion and the inner wall of the casing 30 to force the finger plates 11 rightwards in the figure. One end portion of a conical compression spring 24 engages the bottom portion of the fulcrum plate 10 and the other thereof is disposed through a washer 23 at the inner end portions of the finger plates 11, thus urging the inner end portions of the finger plates toward the shoulder 33 of the socket 9 to pivotally support them and the bottom plate of the fulcrum plate 10 toward the shoulder 22. Further, a conical spring 27 is disposed between the flange 32 of the valve seat member 16 and a flange 31 fixed on the input shaft 1.

A dust cover 41 surrounding the elongated hollow member 36 of the piston 7 is provided for protecting the external surface of the elongated hollow member 36 from dust or other undesirable material. The dust cover 41 is secured at its one end to a flange 42 of the casing 34 and at the other end to the edge of the elongated hollow member 36. Disposed between the flange 42 and the external surface of the elongated hollow member 36 is a packing 43.

A plurality of axial passages 20 are bored in the valve seat member 16 in alignment with axial passages 21 bored in the body of the piston. Both passages 20, 21 communicate with each other. Further, a channel 28 passing through the flange 32 of the valve seat member 16 is provided. The side wall or lands as shown at numerals 18, 19 of the valve seat member 16 adjacent to the passages 20 cooperate with the sealing plate 15 to form a vacuum valve 17 and an air valve 4 between them. As illustrated in FIG. 1, the air valve 4 is located radially inwards from the position of the vacuum valve 17. When the air valve 4 constituted by the inner annular land 18 and the sealing plate 15 opens, the axial passages 20 communicate the channel 47 with the first chamber 3. When the vacuum valve 17 constituted by the land 19 and the sealing plate 15 closes, the communication of the first chamber 3 and the second chamber 5 is cut off so that the differential pressure will be generated between both chambers if the air valve 4 is made open.

In FIG. 1, the motor which is in a non-operative condition is illustrated. The first chamber 3 is maintained in a vacuum condition, because the first chamber communicates with the second chamber 5, in which a vacuum is supplied by a suitable vacuum source (not shown), through the open vacuum valve 17, the axial passages 20 and the axial passages 21. Upon operation of the motor, when an input force F as shown by an arrow in FIG. 1 is supplied to the input shaft 1 connected to, for example, a brake pedal of the vehicle, the socket 9 moves leftwards in the figure through the ball joint 29. The force transmitted to the socket 9 is not directly applied to the output shaft 6, because there is a space for an idle movement of the socket between the tip end of the reduced portion 40 of the output shaft 6 and the bottom end of the bore of the socket 9 for receiving the reduced portion 40. With an increase of the input force F, the inner ends of the finger plates 11 tend to be shifted leftwards while the spring 24 is further compressed, and the finger plates 11 are forced by the return spring 25 rightwards. However, the deflection means ensures a vertical position by overcoming the reaction forces of the springs 24, 25. On the other hand, as the urging force of the spring 27 causes the valve seat member 16 to be moved leftwards with the movement of the input shaft, the outer annular land 19 of the valve seat member 17 is gradually moved closer to the surface of the sealing plate 15 and eventually engages therewith, and thus the vacuum valve 17 will be closed and the communication between the first and second chambers 3, 5 will be shut off.

With the further movement of the socket 9, each finger plate is deflected or inclined to a new position wherein the air valve 4 is opened and the vacuum valve 17 is closed. The opening of the air valve 4 permits atmospheric pressure to be applied to the first chamber 3 through a dust filter (50) in the passage 47, the channel 28, the air valve 4 and the axial passages 20, 21. To apply atmospheric pressure in the first chamber 3, the pressure difference between the first and second chambers 3, 5 occurs and the pressure difference tends to move the diaphragm 2 and the piston 7 leftwards. The force or boosting force caused by the pressure difference is transmitted from the pivots 8 to the outer ends of the finger plates 11. Therefore, the sum of the boosting force applied to the outer ends of the finger plates 11 and the primary input force applied to the inner ends of the finger plates 11 is applied as a total output force to the fulcrum plate 10 associated with the output shaft 6. However, it is noted that as the boosting force and the input force are born by the annular edges 26 which act as the fulcrums between the inner end and outer end portions of the finger plates, the input force and the boosting force will make the moments of opposite direction to each other. Therefore, in the case that the moment of the outside force exerted on the finger plates is greater than that of the inside force thereon, the deflection means 14 is tended to be held in its vertical position. During an angular movement of the deflection means 14, the output force proportional to a degree of the input force F is transmitted to the output shaft and the angular movement or inclination of the deflection means will cease when the deflection means reaches the vertical position where the air valve 4 and the vacuum valve 17 are closed.

When the input force decreases, an operation reverse to that as described hereinbefore will be performed. In this case, the degree of the vacuum in the first chamber 3 drops and the pressure difference deceases. However, as the acting points 8, 26, 33 of the finger plates always are in a nearly same position, substantially no hysteresis phenomenon is generated. When the boosting ratio is not to be changed and only the boosting capacity is to be increased, this will be accomplished only by enlarging the diameters of the housing, the diaphragm and the piston. When the boosting ratio is to be changed, this will be accomplished by changing the pitch circle diameter of the points (26).

It is of course to be understood that the various details structure and the arrangement of the parts may be changed or modified without departing from the sprit and scope of the invention or exceeding the scope of the appended claims.

What we claim is:

1. A vacuum servo motor comprising, a housing having a first and a second chamber therein defined by a partition member, deflection means having finger plates adapted to be deflected when a force imparted to the partition member by a differential pressure between the pressure within both said chambers is transmitted to the outer ends of said deflection means, an input shaft, a socket responsive to movement of said input shaft for displacing the inner ends of said finger plates, an air valve operable according to the degree of deflection of said deflection means to selectively maintain or cut off communication between said first chamber and atmosphere, a vacuum valve operable according to the degree of deflection of said deflection means to selectively maintain or cut off communication between said first chamber and said second chamber, a fulcrum plate for transmitting a boosting force created on said deflection means by said differential pressure and the input force to an output shaft, said partition member comprising a piston disposed in air-tight contact with said housing and a diaphragm air-tightly fixed at its one end to said housing and at the other end to said piston, each outer end part of said finger plates engaging in said piston and each inner end part of said finger plates being swingably supported on said socket to respectively open or close said air valve and said vacuum valve, said deflection means comprising three finger plates and two annular supports, said finger plates being received in notches equidistantly spaced on said supports, a sealing plate adhered to said supports and operable in response to the degree of deflection of said deflection means to selectively maintain or cut off communication between said first chamber and atmosphere, and between said first and second chambers, said sealing plate comprising a part of said air valve and said vacuum valve.

2. A vacuum servo-motor according to claim 1, wherein a valve seat member is received in a recess of said piston in slidable seal contact with said piston and passages are provided in said piston and said valve seat member in facing relation with said sealing plate.

3. A vacuum servo-motor according to claim 2, wherein said input shaft has a ball joint attached to one end thereof, said socket receiving said ball joint, said sealing plate being contacted sealingly to said socket and said deflection means being pivoted to said socket, and a portion of an output shaft being slidably inserted with an axial clearance into a bore of said socket.

4. A vacuum servo-motor according to claim 2, wherein said piston is provided with a hollow elongated member surrounding said input shaft to provide a passage which communicates with said air valve.

* * * * *

UNITED STATES PATENT OFFICE
CERTIFICATE OF CORRECTION

Patent No. 3,838,628          Dated   October 1, 1974

Inventor(s)  YASUO KITA

It is certified that error appears in the above-identified patent
that said Letters Patent are hereby corrected as shown below:

The priority data shown on the patent as

January 29, 1972   Japan. . . . . . . . . .47-108/0 should be

January 29, 1972 Japan. . . . . . . . . 10810/72

Signed and sealed this 11th day of February 1975.

(SEAL)
Attest:

RUTH C. MASON
Attesting Officer

C. MARSHALL DANN
Commissioner of Patents
and Trademarks